(12) United States Patent  
Ushida et al.

(10) Patent No.: US 9,475,349 B1  
(45) Date of Patent: Oct. 25, 2016

(54) TIRE CONDITION MONITORING DEVICE

(71) Applicant: ALPS ELECTRIC CO., LTD., Tokyo (JP)

(72) Inventors: Satoshi Ushida, Miyagi-ken (JP); Shinya Takahata, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/091,425

(22) Filed: Apr. 5, 2016

(30) Foreign Application Priority Data

Apr. 23, 2015 (JP) ................................. 2015-088839

(51) Int. Cl.  
*B60C 23/04* (2006.01)

(52) U.S. Cl.  
CPC ....... *B60C 23/0435* (2013.01); *B60C 23/0455* (2013.01)

(58) Field of Classification Search  
CPC ....................... B60C 23/0435; B60C 23/0455  
USPC ........................................................ 701/29.1  
See application file for complete search history.

(56) References Cited

U.S. PATENT DOCUMENTS

| | | | | |
|---|---|---|---|---|
| 6,445,287 | B1* | 9/2002 | Schofield | B60C 23/0401 340/442 |
| 2008/0294690 | A1* | 11/2008 | McClellan | G01S 5/0027 |
| 2015/0283869 | A1* | 10/2015 | Abughaida | G01K 7/427 702/130 |
| 2016/0075193 | A1* | 3/2016 | Huang | B60C 23/0401 340/447 |
| 2016/0082791 | A1* | 3/2016 | Lin | B60C 23/0415 340/447 |
| 2016/0159469 | A1* | 6/2016 | Vana | B64C 25/34 244/103 R |

FOREIGN PATENT DOCUMENTS

JP 2005-153641 6/2005

* cited by examiner

*Primary Examiner* — McDieunel Marc  
*Assistant Examiner* — James E Stroud  
(74) *Attorney, Agent, or Firm* — Beyer Law Group LLP

(57) ABSTRACT

Each time a time corresponding to one period of an intermittent reception process in a vehicle-side device elapses, a transmission interval of a notification signal is controlled so that a transmission time of a preamble of the notification signal is shifted in a direction in which the transmission time is relatively delayed from an execution time of the reception process. Further, when the transmission time of the preamble passes through a range of the execution time of the reception process during this relative shift, the transmission interval of the notification signal is controlled so that the entire transmission time of the preamble is included in the range of the execution time of the reception process.

10 Claims, 4 Drawing Sheets

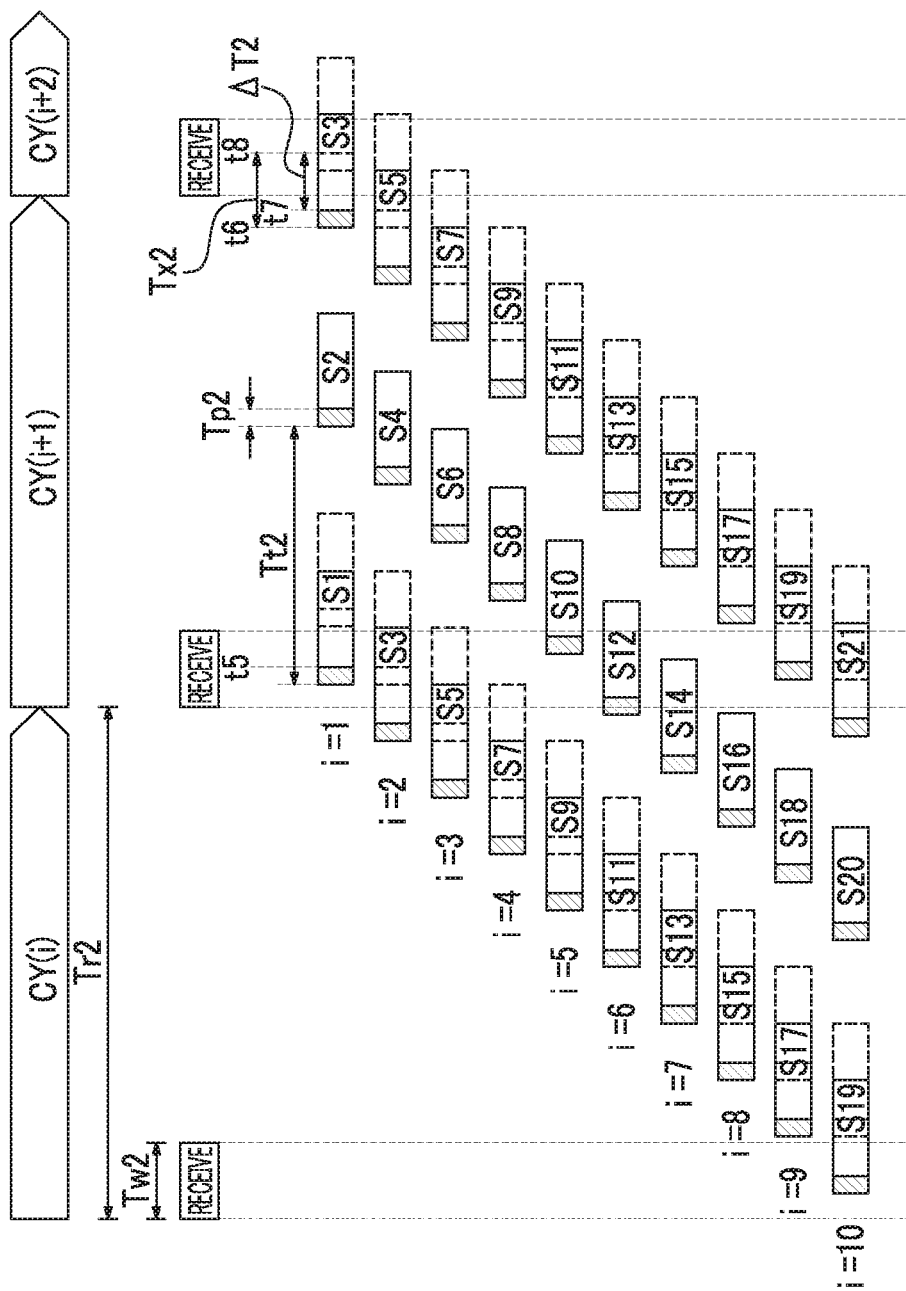

TIRE CONDITION MONITORING DEVICE

CLAIM OF PRIORITY

This application claims benefit of Japanese Patent Application No. 2015-088839 filed on Apr. 23, 2015, which is hereby incorporated by reference.

BACKGROUND OF THE INVENTION

1. Field of the Invention

The present invention relates to a tire condition monitoring device that transmits information for monitoring a condition of a tire from a transmitter installed in the tire to a receiver installed in a vehicle body.

2. Description of the Related Art

A tire pressure monitoring system (TPMS) that detects a pressure of a tire using a sensor, transmits the pressure to a device on the vehicle side, and monitors whether the air pressure is abnormal is known.

In general, in a device on the tire side, a transmitter is controlled so that a transmission interval of a radio signal becomes long at the time of stop of a vehicle in order to reduce consumption of a battery. Further, in the device on the vehicle side, a receiver is controlled to operate intermittently in order to save power at the time of stop of an engine. Therefore, both the transmitter and the receiver may operate intermittently, and it becomes necessary to match timings of transmission and reception.

In a tire pressure monitoring device described in Japanese Unexamined Patent Application Publication No. 2005-153641 below, a data transmission time of a transmitter is longer than an intermittent startup time of a receiver. Accordingly, in a case in which data transmission from the transmitter is performed, the receiver can reliably receive data.

However, if an intensity of radio waves or the like is regulated under regulations, the transmitter cannot take a long time of one transmission. Further, if the transmission time is long, the power of the transmitter increases. Accordingly, a transmission output should be decreased so that the power does not exceed a rated power. As a result, a sufficient reception sensitivity may not be obtained in a receiver on the vehicle side. In such a case, a method of increasing the transmission time as described in Japanese Unexamined Patent Application Publication No. 2005-153641 cannot be adopted.

Instead of increasing the transmission time, decreasing an interval of a reception operation in the receiver may be considered. However, for example, in a case in which the receiver is also used as another system (for example, a keyless entry system), the method in Japanese Unexamined Patent Application Publication No. 2005-153641 cannot be adopted since the interval of the reception operation of the receiver cannot be freely changed.

A method of providing a high-precision real-time clock in both of the transmitter and the receiver may be considered in order to match a transmission timing of the transmitter with a reception timing of the receiver. However, this method has a problem that a circuit configuration is complicated and costs increase.

SUMMARY OF THE INVENTION

The present invention provides a tire condition monitoring device in which a receiver installed in a vehicle body can reliably receive a signal from a transmitter installed in a tire with a simple circuit configuration even when a transmission time of the transmitter is shorter than a reception interval of the receiver in a case in which the transmitter and the receiver operate intermittently.

The present invention provides a tire condition monitoring device that transmits a notification signal for notifying of a condition of a tire from a transmitter installed in the tire to a receiver installed in a vehicle body.

A tire condition monitoring device according to a first aspect of the present invention includes a tire-side control unit configured to intermittently transmit, from the transmitter, a notification signal including a predetermined start signal indicating start of transmission; and a vehicle-side control unit configured to execute a reception process for receiving the notification signal in the receiver, intermittently at a certain period. The tire-side control unit controls a transmission interval of the notification signal so that an interval between a reference time at which the same time as one period of the reception process has elapsed from a time at which the transmission of the start signal starts and a time at which the transmission of the start signal first ends after the reference time becomes shorter than time taken for one execution of the reception process and becomes longer by a first shift time than the transmission time of the start signal.

According to the above configuration, the interval (hereinafter referred to as an "interval Tx1" in this paragraph) between the reference time at which the same time as one period of the reception process has elapsed from the time at which the transmission of the start signal starts and the time at which the transmission of the start signal first ends after the reference time is longer by the first shift time than the transmission time of the start signal. Therefore, the time at which the transmission of the start signal first starts after the reference time is shifted in a direction in which the time is relatively delayed by the first shift time from the reference time at which the same time as one period of the reception process has elapsed from the time at which the transmission of one start signal starts. That is, the transmission period of the start signal is shifted in a direction in which the transmission period is relatively delayed by the first shift time from the execution period of the reception process each time the time corresponding to one period of the reception process elapses. Accordingly, the transmission period of the start signal passes through the execution period of the reception process during repetition of the reception process. At the time of the passage, since the interval Tx1 is shorter than time taken for one execution of the reception process, the entire transmission period of the start signal is included in the execution period of the reception process. Therefore, in this case, the entire start signal is normally received in the receiver.

Preferably, the tire-side control unit may perform intermittent transmission of the notification signal at a transmission interval which is 1/N (N indicates an integer greater than 1) of the period of the reception process. The tire-side control unit may increase the transmission interval from the previous transmission by the first shift time from the transmission interval which is 1/N, for one transmission after repeating (N−1) transmissions at the transmission interval which is 1/N.

According to the above configuration, each time the transmission of the notification signal is repeated N times, the transmission time of the notification signal is shifted in a direction in which the transmission time is relatively delayed by the first shift time from the execution time of the reception process.

Preferably, the tire-side control unit may set the first shift time to 1/M (M indicates an integer greater than 1) of the transmission interval which is 1/N.

A tire condition monitoring device according to a second aspect of the present invention includes a tire-side control unit configured to intermittently transmit, from the transmitter, a notification signal including a predetermined start signal indicating start of transmission; and a vehicle-side control unit configured to execute a reception process for receiving the notification signal in the receiver, intermittently at a certain period. The tire-side control unit controls a transmission interval of the notification signal so that an interval between a reference time at which the same time as one period of the reception process has elapsed from a time at which the transmission of the start signal ends and a time at which the transmission of the start signal last starts before the reference time becomes shorter than time taken for one execution of the reception process and becomes longer than the transmission time of the start signal by a second shift time.

According to the above configuration, the interval (hereinafter referred to as an "interval Tx2" in this paragraph) between the reference time at which the same time as one period of the reception process has elapsed from the time at which the transmission of the start signal ends and the time at which the transmission of the start signal last starts before the reference time is longer by the second shift time than the transmission time of the start signal. Therefore, the time at which the transmission of the start signal last ends before the reference time is shifted in a direction in which the time is relatively earlier by the second shift time than the reference time at which the same time as one period of the reception process has elapsed from the time at which the transmission of one start signal ends. That is, the transmission period of the start signal is shifted in a direction in which the transmission period is relatively earlier by the second shift time than the execution period of the reception process each time the time corresponding to one period of the reception process elapses. Accordingly, the transmission period of the start signal passes through the execution period of the reception process during repetition of the reception process. At the time of the passage, since the interval Tx2 is shorter than time taken for one execution of the reception process, the entire transmission period of the start signal is included in the execution period of the reception process. Therefore, in this case, the entire start signal is normally received in the receiver.

Preferably, the tire-side control unit may perform intermittent transmission of the notification signal at a transmission interval which is 1/N (N indicates an integer greater than 1) of the period of the reception process. The tire-side control unit may decrease the transmission interval from the previous transmission by the second shift time from the transmission interval which is 1/N, for one transmission after repeating (N−1) transmissions at the transmission interval which is 1/N.

According to the above configuration, each time the transmission of the notification signal is repeated N times, the transmission time of the notification signal is shifted in a direction in which the transmission time becomes relatively earlier by the second shift time than the execution time of the reception process.

Preferably, the tire-side control unit may set the second shift time to 1/M (M indicates an integer greater than 1) of the transmission interval which is 1/N.

In the first aspect and the second aspect, the vehicle-side control unit may continuously execute the reception process in a case in which the vehicle-side control unit receives a signal indicating that a driving system of a vehicle is in an operation state, and may intermittently execute the reception process in a case in which the vehicle-side control unit receives a signal indicating that the driving system is in a stop state.

Accordingly, in a case in which the driving system of the vehicle is in an operation state, if the notification signal is transmitted in the transmitter, the notification signal is received immediately in the receiver. Further, in a case in which the driving system is in a stop state, power consumption due to the reception process is reduced since the reception process is executed intermittently in the receiver.

Further, the tire condition monitoring device according to the aspect of the present invention may include a sensor configured to detect an air pressure of the tire. The tire-side control unit may suppress the transmission of the notification signal from the transmitter in a case in which the tire-side control unit determines that the air pressure is normal based on a detection result of the sensor.

Accordingly, in a case in which the air pressure of the tire is normal, consumption of power due to the transmission of the transmitter is suppressed.

According to the present invention, the receiver installed in a vehicle body can reliably receive the signal from a transmitter installed in a tire with a simple circuit configuration in which a real time clock or the like is not used even when a transmission time of the transmitter is shorter than a reception interval of the receiver in a case in which the transmitter and the receiver operate intermittently.

BRIEF DESCRIPTION OF THE DRAWINGS

FIG. 6 is a timing chart for explaining an example of an operation of a tire condition monitoring device according to a second embodiment.

DESCRIPTION OF THE PREFERRED EMBODIMENTS

First Embodiment

Figure 1:
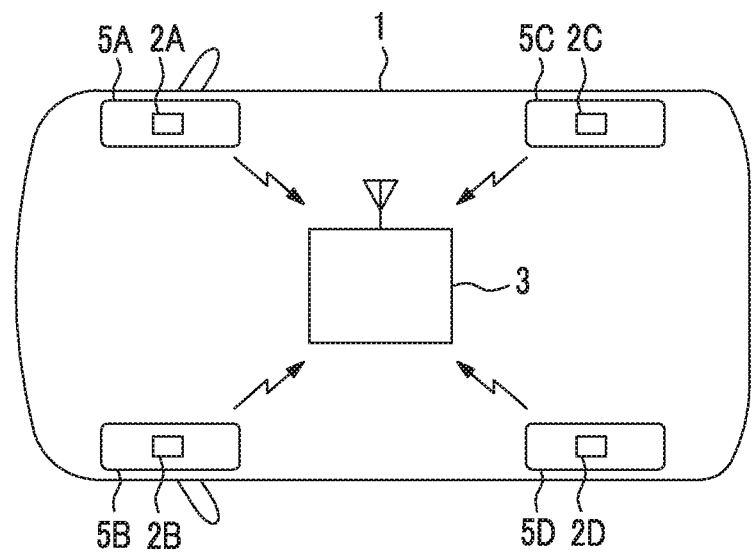
FIG. 1 is a diagram illustrating an example of a configuration of a tire condition monitoring device according to an embodiment of the present invention.

FIG. 1 is a diagram illustrating an example of a configuration of a tire condition monitoring device according to an embodiment of the present invention. The tire condition monitoring device illustrated in FIG. 1 is a device that monitors a condition of air pressure or the like in tires 5A to 5D of a vehicle 1, and includes tire-side devices 2A to 2D provided in the tires 5A to 5D, and a vehicle-side device 3 provided in a body of the vehicle 1. In the following description, any one of the tires 5A to 5D is referred to as "tire 5" as a representative, and any one of the tire-side devices 2A to 2D is referred to as "tire-side device 2" as a representative.

The tire condition monitoring device illustrated in FIG. 1 generally operates as follows. First, each tire-side device 2 detects a condition of the air pressure or the like of the tire 5 using a sensor, and intermittently transmits a notification signal for notifying of the detected state to the vehicle-side device 3. The vehicle-side device 3 receives the notification signal from each tire-side device 2 and monitors the condition of each tire 5. In a case in which the vehicle-side device 3 receives a notification signal indicating abnormality of the tire 5 from the tire-side device 2, the vehicle-side device 3 notifies a higher-level device (an electronic control unit; not illustrated) mounted on the vehicle 1 of the detection of the abnormality. Further, in a case in which a driving system of the vehicle 1 stops (for example, in a case in which an ignition switch is off), the vehicle-side device 3 intermittently executes a process of receiving the notification signal at a certain period.

Figure 2:
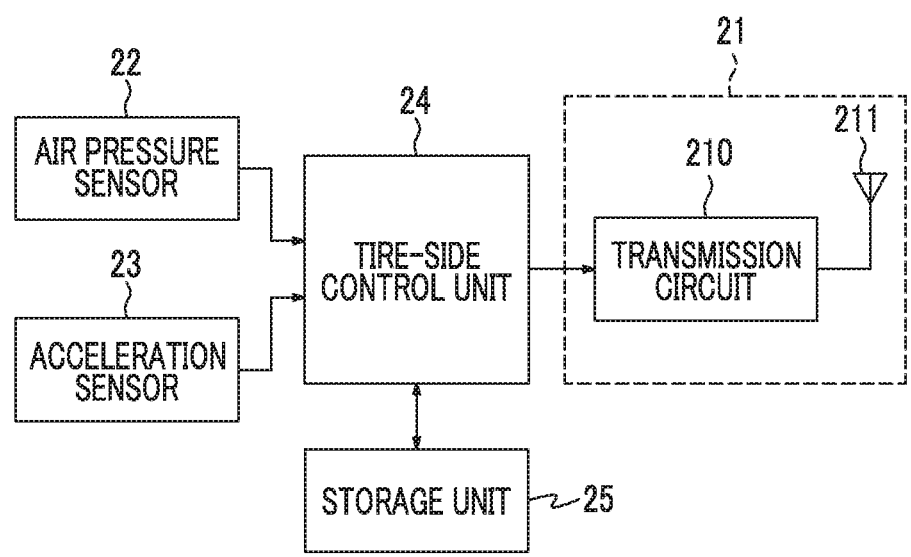
FIG. 2 is a diagram illustrating an example of a configuration of a tire-side device.

FIG. 2 is a diagram illustrating an example of a configuration of the tire-side device 2. The tire-side device 2 illustrated in FIG. 2 is, for example, a device fixed to a wheel portion of the tire 5 together with a tire valve or the like, and includes a transmitter 21, an air pressure sensor 22 that detects air pressure in the inside of the tire 5, an acceleration sensor 23 that detects an acceleration generated in the tire 5, a tire-side control unit 24, and a storage unit 25. The tire-side device 2 is operated by power supplied by a battery (not illustrated).

The transmitter 21 is a circuit that transmits a radio signal to the vehicle-side device 3. In the example of FIG. 2, the transmitter 21 includes a transmission circuit 210 and an antenna 211. The transmission circuit 210 performs predetermined signal processing such as encoding, modulation, or amplification on data for transmission generated in the tire-side control unit 24 to generate a transmission signal, and transmits the transmission signal as the radio signal from the antenna 211.

The tire-side control unit 24 is a circuit that is responsible for an entire process of the tire-side device 2 and includes, for example, a computer (for example, microprocessor) or a dedicated logic circuit (for example, ASIC) that executes commands based on a program stored in the storage unit 25.

The tire-side control unit 24 determines whether the air pressure is included in a normal range based on a detection signal indicating the air pressure in the inside of the tire detected by the air pressure sensor 22. In a case in which the tire-side control unit 24 determines that the air pressure is out of the normal range, the tire-side control unit 24 intermittently transmits a notification signal for notifying the vehicle-side device 3 of the abnormality of the air pressure of the tire 5 from the transmitter 21. In a case in which the air pressure is included in the normal range, the tire-side control unit 24 suppresses the transmission of the notification signal from the transmitter 21.

Figure 3:
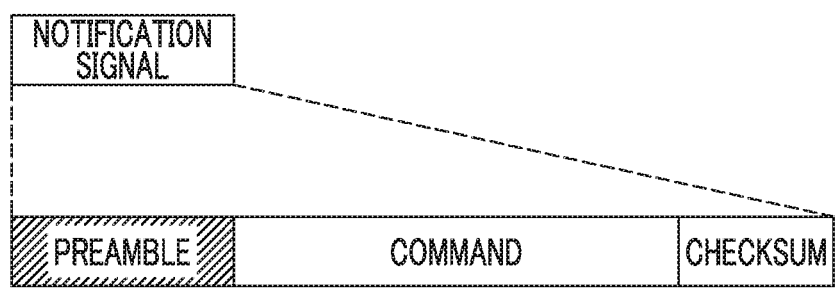
FIG. 3 is a diagram illustrating an example of a configuration of a notification signal transmitted from a tire-side device to a vehicle-side device.

FIG. 3 is a diagram illustrating an example of a configuration of the notification signal transmitted from the tire-side device 2 to the vehicle-side device 3. In the example of FIG. 3, the notification signal includes a "preamble", a "command", and a "checksum".

The "preamble" is a signal indicating that the transmission of the notification signal from the tire-side device 2 starts, and corresponds to a start signal in the embodiment of the present invention. In a case in which the preamble (start signal) is included in a head part of a received signal, the vehicle-side device 3 determines that the received signal is the notification signal from the tire-side device 2, and performs a process of further receiving the rest of the notification signal including the preamble (start signal).

The "command" is a body of the notification signal, and includes information on the condition of the tire 5 (condition of air pressure in the example of FIG. 3).

The "checksum" is information for checking a reception error of the notification signal in the vehicle-side device 3, and is obtained by regarding data included in the notification signal as a numerical value group and performing calculation such as addition.

The tire-side control unit 24 controls a transmission interval Tt1 of the notification signal which is intermittently transmitted from the transmitter 21, as follows. That is, the tire-side control unit 24 controls the transmission interval Tt1 of the notification signal so that a transmission time Tp1 of the preamble of the notification signal is relatively shifted with respect to an execution time Tw1 of the reception process each time the time corresponding to one period Tr1 of an intermittent reception process in the vehicle-side device 3 elapse. Further, the tire-side control unit 24 controls the transmission interval Tt1 of the notification signal so that the entire transmission time Tp1 of the preamble is included in a range of the execution time Tw1 of the reception process when the transmission time Tp1 of the preamble during this relative shift passes through a range of the execution time Tw1 of the reception process.

For example, the tire-side control unit 24 controls the transmission interval Tt1 of the notification signal so that an interval Tx1 between a reference time at which the same time as one period Tr1 of the reception process of the vehicle-side device 3 elapses from the time at which the transmission of the preamble of the notification signal starts and a time at which the transmission of the preamble of the notification signal first ends after this reference time becomes shorter than one execution time Tw1 of the reception process in the vehicle-side device 3 and becomes longer than the transmission time Tp1 of the preamble by a first shift time 4T1.

More specifically, the tire-side control unit 24 performs intermittent transmission of the notification signal at the transmission interval Tt1 (=Tr1/N) which is 1/N (N indicates an integer greater than 1) of the period Tr1 of the reception process of the vehicle-side device 3, and increases the transmission interval from the previous transmission by the first shift time ΔT1 from the transmission interval Tt1 (=Tr1/N), for one transmission after repeating (N−1) transmissions at the transmission interval Tt1.

The tire-side control unit 24 sets the first shift time ΔT1 to a time shorter than a difference between the execution time Tw1 of the reception process and the transmission time Tp1 of the preamble. For example, the tire-side control unit 24 sets the first shift time ΔT1 to 1/M (M indicates an integer greater than 1) of the transmission interval Tt1 (=Tr1/N).

Control of the transmission interval Tt1 described above in the tire-side control unit 24 will be described below in detail with reference to FIG. 5.

The tire-side control unit 24 performs control of the transmission interval Tt1 according to the detection result of the acceleration sensor 23, in addition to the control of the transmission interval Tt1 described above. That is, the tire-side control unit 24 performs a determination as to whether the vehicle 1 is in a stop state based on the detection result of the acceleration sensor 23. In a case in which the vehicle 1 is determined to be in the stop state, the tire-side control unit 24 increases the transmission interval Tt1 of the notification signal. In a case in which the vehicle 1 is in a non-stop state (operation state), the tire-side control unit 24 decreases the transmission interval Tt1 of the notification signal. For example, in a case in which an amount of change in the acceleration detected by the acceleration sensor 23 is smaller than a predetermined threshold value, the tire-side control unit 24 determines that the vehicle 1 is in a stop state and increases the transmission interval Tt1 of the notification signal.

The storage unit 25 is, for example, a device that stores a program of a computer in the tire-side control unit 24, prepared data for processing, or data temporarily stored during processing, and includes a ROM, a RAM, a nonvolatile memory, or the like.

Figure 4:
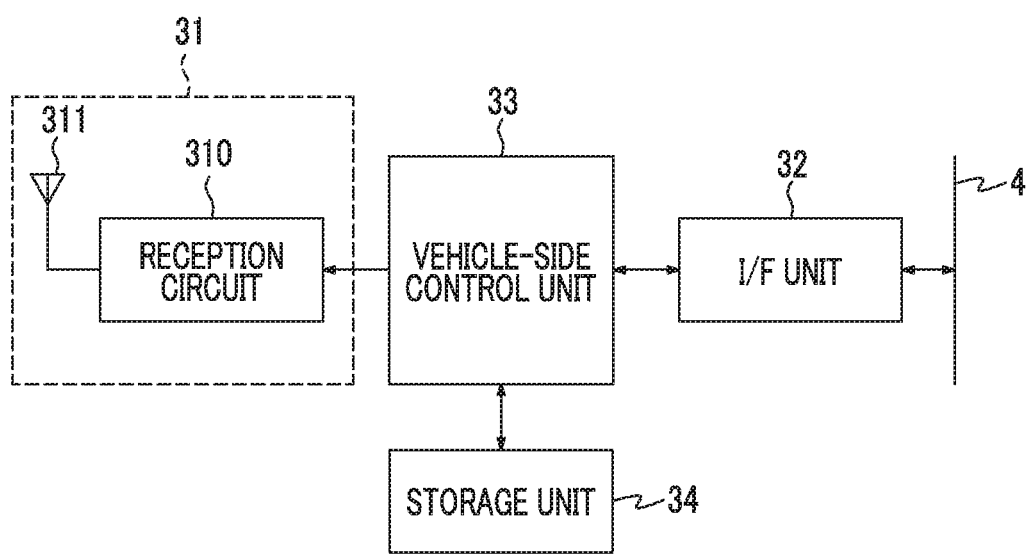
FIG. 4 is a diagram illustrating an example of a configuration of the vehicle-side device.

FIG. 4 is a diagram illustrating an example of a configuration of the vehicle-side device 3. The vehicle-side device 3 illustrated in FIG. 4 is a device installed in a body of the vehicle 1, and includes a receiver 31, an interface unit 32, a vehicle-side control unit 33, and a storage unit 34.

The receiver 31 is a circuit that receives the radio signal which is transmitted from the tire-side device 2 of each tire 5. In the example of FIG. 4, the receiver 31 includes a reception circuit 310, and an antenna 311. The reception circuit 310 performs predetermined signal processing such as amplification, demodulation, and decoding on the radio signal from the tire-side device 2 received by the antenna 311 to generate reception data, and outputs the reception data to the vehicle-side control unit 33.

The interface unit 32 is connected to a higher-level device (for example, electronic control unit) installed in the vehicle 1 via a bus 4, and performs processing regarding communication with the higher-level device according to a communication protocol, such as a controller area network (CAN).

The vehicle-side control unit 33 is a circuit that is responsible for entire processing of the vehicle-side device 3 and includes, for example, a computer (for example, a microprocessor) or a dedicated logic circuit (for example, ASIC) that executes commands based on a program stored in the storage unit 34.

The vehicle-side control unit 33 receives a signal indicating whether the driving system of the vehicle 1 stops, for example, from the higher-level device through the interface unit 32. In a case in which the vehicle-side control unit 33 receives a signal indicating that the driving system of the vehicle 1 is in an operation state, the vehicle-side control unit 33 continuously executes the process of receiving the notification signal in the receiver 31. In a case in which the vehicle-side control unit 33 receives a signal indicating that the driving system of the vehicle 1 stops, the vehicle-side control unit 33 intermittently executes the process of receiving the notification signal at a certain period Tr1.

In a case in which a head part of the signal received by the receiver 31 matches a predetermined pattern, the vehicle-side control unit 33 determines that the received signal is the preamble of the notification signal, and receives the rest of the notification signal following the preamble. In a case in which the vehicle-side control unit 33 receives the preamble of the notification signal when intermittently executing the process of receiving the notification signal, the vehicle-side control unit 33 continues to perform the reception process until the vehicle-side control unit 33 receives all of the rest of the notification signal.

In a case in which the receiver 31 receives the notification signal from the tire-side device 2, the vehicle-side control unit 33 outputs a signal for urging an operation (for example, a warning display in a dashboard of the vehicle 1) according to the notification signal from the interface unit 32 to the higher-level device.

The storage unit 34 is, for example, a device that stores a program of a computer in the vehicle-side control unit 33, prepared data for processing, or data temporarily stored during processing, and includes a ROM, a RAM, a nonvolatile memory, a hard disk, or the like. The program or the data stored in the storage unit 34 may be downloaded from a server device (not illustrated) via the interface unit 32 or another communication interface, or may be read from a non-transitory storage medium, such as an optical disc or a USB memory.

An operation of the tire condition monitoring device according to the first embodiment having the above-described configuration will be described herein with reference to a timing chart of FIG. 5.

Figure 5:
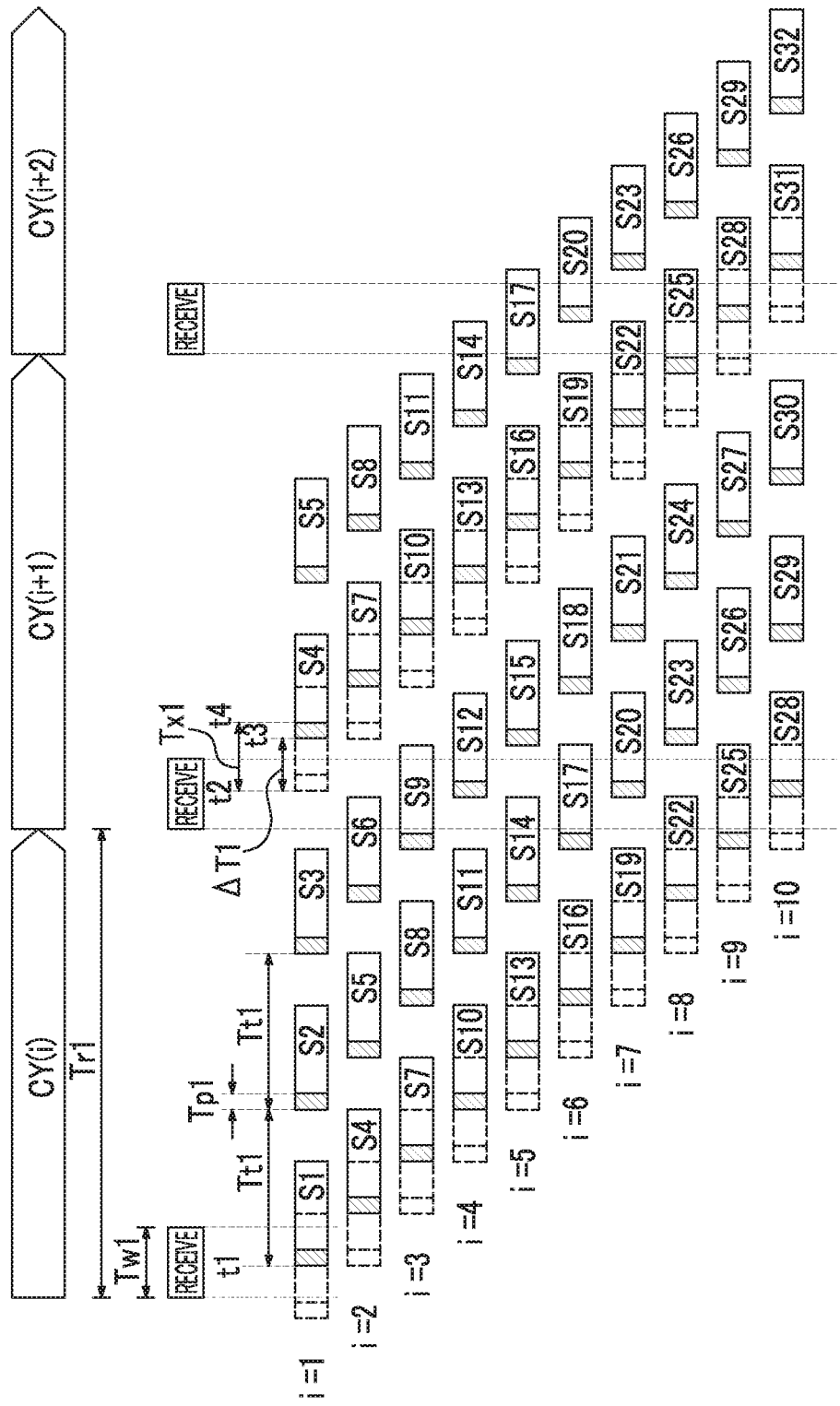
FIG. 5 is a diagram for explaining an example of an operation of a tire condition monitoring device according to a first embodiment.

"CY(i)", "CY(i+1)", and "CY(i+2)" (i=1, 2, 3, . . . ) in the timing chart of FIG. 5 indicate three consecutive cycles of the reception process executed at a certain period Tr1 by the receiver 31 of the vehicle-side device 3. A value (i, i+1, i+2) in parentheses denotes an order of the cycle of the reception process. In this timing chart, a relationship between an execution timing of the reception process of the three consecutive cycles and a timing at which notification signals (S1, S2, S3, . . . ) are transmitted from the transmitter 21 of the tire-side device 2 is represented using a horizontal direction as a direction of a time axis. Further, in FIG. 5, due to a limited width of paper, a timing chart of three cycles in which time has progressed by one cycle is illustrated just below the timing chart of the three consecutive cycles. Thus, the timing chart from a cycle CY(1) to a cycle CY(12) of the reception process is illustrated in FIG. 5.

In the timing chart of FIG. 5, hatched portions in figures indicating the notification signals S1, S2, S3, . . . indicate preambles.

Focusing on a timing chart (i=1) of a first line in FIG. 5, time t1 is a time at which transmission of the preamble of the notification signal S1 starts, and time t2 is a reference time at which the same time as a period Tr1 of the reception process elapses from time t1 (t2−t1=Tr1). Further, time t3 is a time at which transmission of the preamble of the notification signal first starts after reference time t2, and time t4 is a time at which the transmission of the preamble of this notification signal ends. The tire-side control unit 24 of the tire-side device 2 controls the transmission interval Tt1 of the notification signal so that an interval Tx1 between time t4 and reference time t2 is shorter than the execution time Tw1 of the reception process and is longer than the transmission time Tp1 of the preamble by a first shift time ΔT1 (Tx1=Tp1+ΔT1).

If the first shift time ΔT1 is set to 0, the interval Tx1 between time t4 and reference time t2 becomes equal to transmission time Tp1 of the preamble, and reference time t2 matches transmission start time t3 of the preamble of the notification signal S4. That is, at reference time t2 (=t3) at which the same time as the period Tr1 elapses from time t1 at which the transmission of the preamble of the notification signal S1 starts, the transmission of the preamble of the notification signal S4 starts. This means that a relative timing between a period in which the reception process of the vehicle-side device 3 is executed and a period in which the preamble of the notification signal is transmitted does not change. Since the transmitter 21 of the tire-side device 2 and the receiver 31 of the vehicle-side device 3 operate independently, a relative timing between both is undefined, and is likely to be completely shifted in an initial state. If the relative timing between both is shifted in the initial state, this shift state is maintained and the vehicle-side device 3 cannot receive the notification signal.

On the other hand, in the tire condition monitoring device according to this embodiment, the first shift time ΔT1 is set to a predetermined period of time rather than 0. That is, time t3 at which the transmission of the preamble first starts after reference time t2 is shifted in a direction in which time t3 is relatively delayed by the first shift time ΔT1 from reference time t2 at which the same time as the period Tr1 of the reception process elapses from time t1 at which the transmission of the preamble starts. That is, the transmission period of the preamble is shifted in a direction in which the transmission period is relatively delayed by the first shift time ΔT1 from the execution period of the reception process each time the time corresponding to the period Tr1 of the reception process elapses. Accordingly, as is apparent from FIG. 5, the transmission period of the preamble necessarily passes through the execution period of the reception process during repetition of the reception process.

When the transmission period of the preamble passes through the execution period of the reception process, the entire transmission period of the preamble is included in the execution period of the reception process since the interval Tx1 (=Tp1+ΔT1) is shorter than the execution time Tw1 of the reception process.

That is, since a time (Tp1+ΔT1) obtained by summing a length (Tp1) of the transmission period of the preamble and an amount of shift (ΔT1) of the transmission period of the preamble in one period Tr1 is shorter than the execution time Tw1 of the reception process, if a portion of the transmission period of the preamble in the cycle CY(i+1) is included in the execution period of the reception process, the entire transmission period of the preamble is included in the execution period of the reception process in the cycle CY(i) or the cycle CY(i+2). Further, in a case in which the transmission period of the preamble does not overlap the execution period of the reception process at all, the transmission period of the preamble does not passes through the execution period of the reception process without overlapping the execution period of the reception process with only the shift (ΔT1) of one cycle, and a state in which the entire transmission period of the preamble is included in the execution period of the reception process necessarily occurs.

If the entire transmission period of the preamble is included in the execution period of the reception process, the entire preamble is received by the receiver 31 of the vehicle-side device 3, and the entire notification signal including this preamble is received by the receiver 31. Therefore, the notification signal is normally received by the receiver 31.

In the example of FIG. 5, the tire-side control unit 24 performs intermittent transmission of the notification signal at a transmission interval Tt1 (=Tr1/3) which is 1/3 of the period Tr1 of the reception process of the vehicle-side device 3. Further, the tire-side control unit 24 increases, for one transmission after repeating two transmissions at the transmission interval Tt1, the transmission interval from the previous transmission by a first shift time ΔT1 from the transmission interval Tt1 (Tt1+ΔT1). For example, the transmission interval between the notification signals S1 and S2 and the transmission interval between the notification signals S2 and S3 are "Tt1", and the transmission interval between the notification signals S3 and S4 is "Tt1+ΔT1".

Further, in the example of FIG. 5, the tire-side control unit 24 sets the first shift time ΔT1 to 1/3 of the transmission interval Tt1 (=Tr1/3). A state in which the entire transmission period of the preamble is included in the execution period of the reception process occurs once for eight or eleven transmissions of the notification signal (S1, S12, S20, and S28).

As described above, according to the tire condition monitoring device according to the first embodiment, each time the time corresponding to one period Tr1 of the intermittent reception process in the vehicle-side device 3 elapses, the transmission interval Tt1 of the notification signal is controlled so that the transmission time Tp1 of the preamble of the notification signal is relatively shifted with respect to the execution time Tw1 of the reception process. Further, when the transmission time Tp1 of the preamble passes through a range of the execution time Tw1 of the reception process during this relative shift, the transmission interval Tt1 of the notification signal is controlled so that the entire transmission time Tp1 of the preamble is included in the range of the execution time Tw1 of the reception process.

Accordingly, in a case in which the transmitter 21 of the tire-side device 2 and the receiver 31 of the vehicle-side device 3 operate intermittently, the receiver 31 can reliably receive the notification signal from the transmitter 21 with a simple circuit configuration in which a real time clock or the like is not used, even when the transmission time of the transmitter 21 is shorter than the execution interval of the reception process of the receiver 31.

Further, since the transmission time of the transmitter 21 is shorter than the execution interval of the reception process of the receiver 31, it is possible to reliably perform reception of the notification signal while complying with regulations in a case in which intensity of radio waves or the like is regulated under regulations.

Further, according to the tire condition monitoring device according to this embodiment, since the reception process is continuously performed in the receiver 31 of the vehicle-side device 3 in a case in which the driving system of the vehicle 1 is in an operation state, if the notification signal is transmitted in the transmitter 21 of the tire-side device 2, the receiver 31 can immediately receive the notification signal and rapidly perform a predetermined operation (for example, warning display in a dashboard) according to the notification signal. Further, since the reception process is performed intermittently in the receiver 31 in a case in which the driving system of the vehicle 1 is in a stop state, it is possible to reduce power consumption due to the reception process in the receiver 31.

Further, according to the tire condition monitoring device according to this embodiment, in a case in which the air pressure is determined to be normal based on the detection result of the air pressure sensor 22 in the tire-side device 2, the transmission of the notification signal from the transmitter 21 is suppressed. Accordingly, in a case in which the tire pressure is normal, it is possible to suppress power consumption due to the transmission of the transmitter 21.

Second Embodiment

Next, a second embodiment of the present invention will be described.

In the tire condition monitoring device according to the first embodiment described above, the transmission period of the preamble is shifted in the direction in which the transmission period is delayed by the first shift time ΔT1 during periodic repetition of the reception process of the vehicle-side device 3, whereas in the tire condition monitoring device according to the second embodiment, the transmission period of the preamble is shifted in a direction in which the transmission period becomes earlier.

The tire condition monitoring device according to the second embodiment is different from the tire condition monitoring device illustrated in FIG. 1 in a method of controlling the transmission interval of the notification signal in the tire-side control unit 24 of the tire-side device 2, and other configurations are the same as those in the tire condition monitoring device illustrated in FIG. 1. Accordingly, a difference will be described.

In the tire condition monitoring device according to this embodiment, the tire-side control unit 24 controls a transmission interval Tt2 of the notification signal which is intermittently transmitted from the transmitter 21, as follows. That is, the tire-side control unit 24 controls the transmission interval Tt2 of the notification signal so that a transmission time Tp2 of the preamble of the notification signal is relatively shifted in a direction in which the transmission time Tp2 is earlier than an execution time Tw2 of the reception process each time the time corresponding to one period Tr2 of an intermittent reception process in the vehicle-side device 3 elapse. Further, the tire-side control unit 24 controls the transmission interval Tt1 of the notification signal so that the entire transmission time Tp2 of the preamble is included in a range of the execution time Tw2 of the reception process when the transmission time Tp2 of the preamble during this relative shift passes through a range of the execution time Tw2 of the reception process.

For example, the tire-side control unit 24 controls the transmission interval Tt2 of the notification signal so that an interval Tx2 between a time at which the same time as one period Tr2 of the reception process of the vehicle-side device 3 elapses from the time at which the transmission of the preamble of the notification signal ends and a time at which the transmission of the preamble of the notification signal last starts before such a time becomes shorter than one execution time Tw2 of the reception process in the vehicle-side device 3 and becomes longer than the transmission time Tp2 of the preamble by a second shift time ΔT2.

More specifically, the tire-side control unit 24 performs intermittent transmission of the notification signal at the transmission interval Tt2 (=Tr2/N) which is 1/N (N indicates an integer greater than 1) of the period Tr2 of the reception process of the vehicle-side device 3, and decreases the transmission interval from the previous transmission by the second shift time ΔT2 from the transmission interval Tt2 (=Tr2/N), for one transmission after repeating (N−1) transmissions at the transmission interval Tt2.

The tire-side control unit 24 sets the second shift time ΔT2 to a time shorter than a difference between the execution time Tw2 of the reception process and the transmission time Tp2 of the preamble. For example, the tire-side control unit 24 sets the second shift time ΔT2 to 1/M (M indicates an integer greater than 1) of the transmission interval Tt2 (=Tr2/N).

FIG. 6 is a timing chart for explaining an operation of the tire condition monitoring device according to the second embodiment.

Focusing on a timing chart (i=1) of a first line in FIG. 6, time t5 is a time at which transmission of the preamble of the notification signal S1 ends, and time t8 is a reference time at which the same time as a period Tr2 of the reception process elapses from time t5 (t8−t5=Tr2). Further, time t6 is a time at which the transmission of the preamble of the notification signal last starts before reference time t8, and time t7 is a time at which the transmission of the preamble of this notification signal ends. The tire-side control unit 24 of the tire-side device 2 controls the transmission interval Tt2 of the notification signal so that an interval Tx2 between time t6 and reference time t8 is shorter than the execution time Tw2 of the reception process and is longer than the transmission time Tp2 of the preamble by a second shift time ΔT2 (Tx2=Tp2+ΔT2).

If the second shift time ΔT2 is set to 0, the interval Tx2 between time t6 and reference time t8 becomes equal to transmission time Tp2 of the preamble, and reference time t8 matches transmission end time t7 of the preamble of the notification signal S3. That is, at reference time t8 (=t7) at which the same time as the period Tr2 elapses from time t5 at which the transmission of the preamble of the notification signal S1 end, the transmission of the preamble of the notification signal S3 end. This means that a relative timing between a period in which the reception process of the vehicle-side device 3 is executed and a period in which the preamble of the notification signal is transmitted does not change. If the relative timing between both is shifted in an initial state, this shift state is maintained and the vehicle-side device 3 cannot receive the notification signal.

On the other hand, in the tire condition monitoring device according to this embodiment, the second shift time ΔT2 is set to a predetermined period of time rather than 0. That is, time t7 at which the transmission of the preamble last ends before reference time t8 is shifted in a direction in which time t7 becomes relatively earlier by the second shift time ΔT2 than reference time t8 at which the same time as the period Tr2 of the reception process elapses from time t5 at which the transmission of the preamble end. That is, the transmission period of the preamble is shifted in a direction in which the transmission period becomes relatively earlier by the second shift time ΔT2 than the execution period of the reception process each time the time corresponding to the period Tr2 of the reception process elapses. Accordingly, as is apparent from FIG. 6, the transmission period of the preamble necessarily passes through the execution period of the reception process during repetition of the reception process.

When the transmission period of the preamble passes through the execution period of the reception process, the entire transmission period of the preamble is included in the execution period of the reception process since the interval Tx2 (=Tp2+ΔT2) is shorter than the execution time Tw2 of the reception process.

That is, since a time (Tp2+ΔT2) obtained by summing a length (Tp2) of the transmission period of the preamble and an amount of shift (ΔT2) of the transmission period of the preamble in one period Tr2 is shorter than the execution time Tw2 of the reception process, if a portion of the transmission period of the preamble in the cycle CY(i+1) is included in the execution period of the reception process, the entire transmission period of the preamble is included in the execution period of the reception process in the cycle CY(i) or the cycle CY(i+2). Further, in a case in which the transmission period of the preamble does not overlap the execution period of the reception process at all, the transmission period of the preamble does not passes through the execution period of the reception process without overlapping the execution period of the reception process with only the shift (ΔT2) of one cycle, and a state in which the entire transmission period of the preamble is included in the execution period of the reception process necessarily occurs.

If the entire transmission period of the preamble is included in the execution period of the reception process, the entire preamble is received by the receiver 31 of the vehicle-side device 3, and the entire notification signal including this preamble is received by the receiver 31. Therefore, the notification signal is normally received by the receiver 31.

As described above, according to the tire condition monitoring device according to this embodiment, the transmission interval Tt2 of the notification signal is controlled so that the transmission time Tp2 of the preamble of the notification signal is shifted in a direction in which the transmission time Tp2 is relatively earlier than the execution time Tw2 of the reception process each time the time corresponding to one period Tr2 of the intermittent reception process in the vehicle-side device 3 elapse. Further, the transmission interval Tt2 of the notification signal is controlled so that the entire transmission time Tp2 of the preamble is included in a range of the execution time Tw2 of the reception process when the transmission time Tp2 of the preamble during this relative shift passes through the range of the execution time Tw2 of the reception process.

Therefore, the receiver 31 can reliably receive the notification signal from the transmitter 21 with a simple circuit configuration in which a real time clock or the like is not used with the transmission time of the transmitter 21 being shorter than the execution interval of the reception process of the receiver 31, as in the first embodiment.

While several embodiments of the present invention have been described above, the present invention is not limited to the above-described embodiments and includes various other variations.

While the example in which the intermittent transmission of the notification signal is performed at the transmission interval which is 1/N of the period of the reception process, and the transmission interval from the previous transmission is shifted (increased or decreased) by a predetermined shift time from the transmission interval which is 1/N, for one transmission after repetition of (N−1) transmissions at the transmission interval which is 1/N has been described in the above-described embodiment, the present invention is not limited thereto. In another embodiment of the present invention, generation of the shift time may be equally distributed to N-transmission intervals.

Further, the vehicle-side device 3 in the above-described embodiment may also be used as a keyless entry system that performs vehicle control such as unlocking according to a signal from a portable device, and may be provided independently of the keyless entry system.

It should be understood by those skilled in the art that various modifications, combinations, sub-combinations and alterations may occur depending on design requirements and other factors insofar as they are within the scope of the appended claims of the equivalents thereof.

What is claimed is:

1. A tire condition monitoring device comprising:
a transmitter installed in a tire, configured to transmit a notification signal for notifying of a condition of the tire;
a receiver installed in a vehicle body configured to receive the notification signal from the transmitter;
a tire-side control unit configured to cause the transmitter to intermittently and periodically transmit the notification signal, the notification signal including a predetermined start signal indicating a start of a transmission of the notification signal; and
a vehicle-side control unit configured to control the receiver to intermittently and periodically execute a reception process for receiving the notification signal with a predetermined cycle,
wherein the tire-side control unit controls a transmission interval for the transmission of the notification signal such that a first interval between a first reference time which is a period of the predetermined cycle after a transmission of the start signal started and an end time at which the transmission of the start signal ends first time after the first reference time is shorter than an execution time period for executing the reception process, and that the first interval between the first reference time and the end time is longer by a first shift time than a transmission time period for transmitting the start signal.

2. The tire condition monitoring device according to claim 1,
wherein the tire-side control unit performs the transmission of the notification signal such that the transmission interval is set to 1/N (N is an integer greater than 1) of the predetermined cycle of the reception process for (N−1) transmissions, and is increased for an N-th transmission by the first shift time from the previous transmission interval of 1/N of the predetermined cycle.

3. The tire condition monitoring device according to claim 2,
wherein the tire-side control unit sets the first shift time to 1/M (M is an integer greater than 1) of the transmission interval which is 1/N of the predetermined cycle of the reception process.

4. A tire condition monitoring device comprising:
a transmitter installed in a tire, configured to transmit a notification signal for notifying of a condition of the tire;
a receiver installed in a vehicle body configured to receive the notification signal from the transmitter;
a tire-side control unit configured to cause the transmitter to intermittently and periodically transmit the notification signal, the notification signal including a predetermined start signal indicating a start of a transmission of the notification signal; and
a vehicle-side control unit configured to control the receiver to intermittently and periodically execute a reception process for receiving the notification signal with a predetermined cycle,
wherein the tire-side control unit controls a transmission interval for the transmission of the notification signal such that a second interval between a second reference time which is a period of the predetermined cycle after a transmission of the start signal ends and a start time at which the transmission of the start signal last started before the second reference time is shorter than an execution time period for executing the reception process, and the second interval between the second reference time and the start time is longer by a second shift time than a transmission time period for transmitting the start signal.

5. The tire condition monitoring device according to claim 4,
wherein the tire-side control unit performs the transmission of the notification signal such that the transmission interval is set to 1/N (N is an integer greater than 1) of the predetermined cycle period of the reception process for (N−1) transmissions, and is decreased for an N-th transmission by the second shift time from the previous transmission interval of 1/N of the predetermined cycle.

6. The tire condition monitoring device according to claim 5,
wherein the tire-side control unit sets the second shift time to 1/M (M is an integer greater than 1) of the transmission interval which is 1/N of the predetermined cycle of the reception process.

7. The tire condition monitoring device according to claim 1,
wherein the vehicle-side control unit continuously executes the reception process if the vehicle-side control unit receives a signal indicating that a driving system of the vehicle is in an operation state, and intermittently executes the reception process if the vehicle-side control unit receives a signal indicating that the driving system is in a stop state.

8. The tire condition monitoring device according to claim 4,
wherein the vehicle-side control unit continuously executes the reception process if the vehicle-side control unit receives a signal indicating that a driving system of the vehicle is in an operation state, and intermittently executes the reception process if the vehicle-side control unit receives a signal indicating that the driving system is in a stop state.

9. The tire condition monitoring device according to claim 1, further comprising:
a sensor configured to detect an air pressure of the tire,
wherein the tire-side control unit suppresses the transmission of the notification signal from the transmitter if the tire-side control unit determines that the air pressure is normal based on a detection result of the sensor.

10. The tire condition monitoring device according to claim 4, further comprising:
a sensor configured to detect an air pressure of the tire,
wherein the tire-side control unit suppresses the transmission of the notification signal from the transmitter if the tire-side control unit determines that the air pressure is normal based on a detection result of the sensor.

* * * * *